United States Patent [19]
May

[11] Patent Number: 5,657,829
[45] Date of Patent: *Aug. 19, 1997

[54] HYBRID CONTROL SYSTEM FOR LIMITING ENGINE OUTPUT

[75] Inventor: Kenneth A. May, Churchville, N.Y.

[73] Assignee: Zexel Torsen Inc., Rochester, N.Y.

[*] Notice: The term of this patent shall not extend beyond the expiration date of Pat. No. 5,431,241.

[21] Appl. No.: 500,668

[22] Filed: Jul. 10, 1995

Related U.S. Application Data

[63] Continuation-in-part of Ser. No. 251,617, May 31, 1994, Pat. No. 5,431,241.

[51] Int. Cl.$^6$ ............................................. B60K 28/16
[52] U.S. Cl. ............................................ 180/197; 180/370
[58] Field of Search ............................ 180/197, 337, 180/370, 244

[56] References Cited

U.S. PATENT DOCUMENTS

| | | | |
|---|---|---|---|
| 2,426,365 | 8/1947 | Matlock | 180/370 X |
| 4,667,760 | 5/1987 | Takimoto | 180/370 X |
| 4,721,176 | 1/1988 | Kabasin et al. | 180/197 |
| 4,722,411 | 2/1988 | Ohashi et al. | 180/197 |
| 4,739,856 | 4/1988 | Inagaki et al. | 180/197 |
| 4,747,461 | 5/1988 | Hayn et al. | 180/197 |
| 4,762,196 | 8/1988 | Harada et al. | 180/197 |
| 4,779,696 | 10/1988 | Harada et al. | 180/197 |
| 4,850,656 | 7/1989 | Ise et al. | 303/100 |
| 4,866,618 | 9/1989 | Tamura et al. | 364/431.03 |
| 4,866,623 | 9/1989 | Ise et al. | 364/424.03 |
| 4,873,639 | 10/1989 | Sato et al. | 364/426.02 |
| 4,884,651 | 12/1989 | Harada et al. | 180/197 |
| 4,917,208 | 4/1990 | Komoda | 180/197 |
| 4,939,656 | 7/1990 | Hoashi et al. | 364/426.02 |
| 5,119,915 | 6/1992 | Nelson | 192/106.1 |
| 5,231,893 | 8/1993 | Sisco et al. | 74/574 |
| 5,255,193 | 10/1993 | Katayose et al. | 364/426.02 |
| 5,265,693 | 11/1993 | Rees et al. | 180/197 |
| 5,303,794 | 4/1994 | Hrovat et al. | 180/197 |
| 5,337,853 | 8/1994 | Magni | 180/370 |

FOREIGN PATENT DOCUMENTS

6054517  2/1994  Japan.

OTHER PUBLICATIONS

"Analysis of Traction Control Systems Augmented by Limited Slip Differentials" by Robert K. Holzwarth and Kenneth A. May, 940831, 1994 Society of Automotive Engineers, 9 pages.

Primary Examiner—Kevin Hurley
Attorney, Agent, or Firm—Eugene Stephens & Associates

[57] ABSTRACT

A traction control system combines engine output power limiting with a single point brake for controlling wheel slip. The brake is preferably connected to the engine to reduce torque requirements and avoid drive line shock. One friction member of the preferred brake is coupled to the engine block, and another friction member member is coupled together with a drive pulley to the engine output shaft. An electromagnetic actuator moves the two friction members into engagement with each other within a hollow interior of the drive pulley.

38 Claims, 9 Drawing Sheets

HYBRID CONTROL SYSTEM FOR LIMITING ENGINE OUTPUT

RELATED APPLICATIONS

This application is a continuation-in-part of allowed parent application Ser. No. 08/251,617, filed 31 May 1994, entitled HYBRID TRACTION CONTROL SYSTEM, now U.S. Pat. No. 5,431,241. The parent application is hereby incorporated by reference.

TECHNICAL FIELD

The invention relates to control systems for motor vehicles including traction control systems that provide more than one type of response to wheel slipping.

BACKGROUND

Traction control systems of motor vehicles limit wheel slipping in which a drive wheel overruns its traction surface. Slipping occurs when more torque is imparted to a drive wheel than can be withstood by its traction surface for correspondingly moving the vehicle. The excess torque causes a sudden increase in drive wheel rotational speed with respect to its traction surface, referred to herein as wheel slipping.

Traction measured as a force is a function of wheel slip measured as a percentage of overall drive wheel rotation that is in excess of rolling contact with the traction surface. A small percentage of wheel slip is needed to fully exploit the available traction force, but larger percentages of wheel slip reduce the traction force. Accordingly, wheel slipping, i.e., large percentages of wheel slip, actually reduces the amount of power that can be used to move a vehicle. Excess wheel slip also reduces lateral stability.

Many traction control systems have evolved as extensions of anti-lock braking systems. However, instead of reducing brake pressures in response to wheel skidding, the traction control systems increase brake pressures in response to excessive wheel slip. The same sensors can be used by both systems to monitor rotational speeds of the wheels.

However, the use of individual drive wheel brakes for traction control has many disadvantages. For example, the application of individual drive wheel brakes can produce shocks in the drive line or reflect excess torque between paired drive wheels resulting in drive line instabilities known as "hunting". Excessive use of the brakes causes accelerated wear. Engine output power can often overwhelm the power-absorbing capacities of the wheel brakes. Also, the application of the wheel brakes requires the generation of fluid pressure and its controlled conversion into mechanical braking torques, which can delay appropriate braking responses.

Other traction control systems regulate engine output power to limit wheel slip. The engine output power of internal combustion engines is controlled by regulating ignition, air intake, fuel intake, or exhaust. Engine controllers already regulate some or all of these functions, so little additional hardware is required for traction control. However, throttle controls are sometimes preferred for directly overriding operator commands to the engine.

Although most engine output controls, including throttle controls, have nearly unlimited capacity for reducing output power to the drive wheels, the response to excessive wheel slip is slow. For example, significant wheel slipping and associated further loss of traction can occur before output power can be sufficiently reduced to regain traction. Over-compensation for wheel slip can also limit vehicle acceleration, uphill speeds, and towing capacity, which detract from potential vehicle performance.

Some hybrid traction control systems combine engine output power controls with drive wheel brake controls for limiting wheel slipping. However, the combination does not necessarily mitigate the drawbacks of using engine output power controls or wheel brake controls separately. For example, primary use of the wheel brakes can still cause drive line shocks and accelerated wear, whereas primary use of the engine output power controls is still too slow to prevent excessive wheel slip.

U.S. Pat. No. 5,303,794 to Hrovat et al. discloses another hybrid traction control system, which combines engine output power controls with specially controlled clutches of a multiple clutch transmission for regulating output power to a pair of drive wheels. Each of the clutches connects the engine to the drive wheels at a different speed ratio. Partially engaging one of the clutches to the so-called "higher gear" speed ratio while another clutch is already engaged causes a windup in the drive train which further loads the engine. The windup generates some additional friction because of higher loading forces and the engagement of more gears, but the amount of friction must be limited to avoid over-stressing the gears. The main effect on the engine is believed to come from transferring torque to the drive wheels through the partially engaged clutch at a lower mechanical advantage, similar to the immediate effect of upshifting the transmission.

However, if the transmission is already in high gear, the engine load cannot be further increased by at least partially engaging both clutches. In fact, the partial downshifting engagement of a lower gear would decrease engine load by improving mechanical advantage of the engine over the drive wheels. Conversely, the amount of additional engine load by partially upshifting is limited by the difference between the engaged and partially engaged speed ratios. Also, engine inertia effective through backlash in the drive train would cause the drive wheels to momentarily increase in speed, which delays the desired effect of limiting wheel spin.

SUMMARY OF INVENTION

Our invention relates to a hybrid traction system that combines power train braking with engine output power reductions to limit wheel slip. However, instead of using two or more drive wheel brakes to perform the braking function, a single point brake is positioned along the power train to regulate transmissions of output power to the drive wheels. The single point brake operates with a mechanical advantage over the wheel brakes for limiting transmissions of engine power to the drive wheels. Smaller torques accompanying use of the single point brake are expected to reduce drive line shock.

Conventional power trains originate at an internal combustion engine that includes a fixed block and an output shaft, referred to as a crankshaft, that is rotatively mounted in the block. In one direction from the output shaft, the power trains transmit a portion of engine output power to auxiliary devices such as alternators, compressors, and pumps. In another direction from the output shaft, the power trains transmit the remaining engine power along a drive line to a pair of drive wheels. Differentials mounted along the drive lines apportion drive torque between the drive wheels.

Our single point brake is positioned along the power train between the auxiliary devices and the differential to regulate transmission of output power to the drive wheels collectively. The brake has first and second relatively movable members (e.g., a stator and a rotor) that are engageable for producing resistance to rotation of the engine output shaft with respect to the engine block. The first brake member is fixed against relative rotation with respect to the engine block, and the second brake member is at least indirectly connected to the output shaft.

Preferably, the brake is connected as close as possible to the engine to achieve the greatest mechanical advantage. One especially preferred location is between the engine and the auxiliary devices. Within this section of the power train, a drive pulley is ordinarily coupled to the output shaft for transmitting the output power to the auxiliary devices. Both members of the brake are preferably at least partially housed within a hollow interior of the pulley, the first member being attached to the engine block and the second member being coupled to the output shaft or pulley. This location is readily available in most automobiles and can have a twelve-to-one or higher mechanical advantage over wheel brakes that operate through speed ratio changes in both a transmission and a final drive to the drive wheels. Also, the attachment of the first member to the engine block provides so-called "positive grounding" for instantly interrupting inertia of the engine output shaft.

A variety of different types of actuation can be used to relatively engage the two brake members for generating resistance to relative rotation between the engine output shaft and block. The relative engagement can take place either with or without contact between the two members. Contacting technologies, which ordinarily involve relative movement between the two members, include electromechanical, hydraulic, and pneumatic generated resistance. Non-contacting technologies, which ordinarily do not involve such relative movement, include eddy current, generator, and magnetic particle generated resistance.

We prefer to use an electromagnetic actuator for controlling relative movement between the two brake members. For example, the first member can incorporate an electromagnetic coil, and the second member can incorporate an armature that is attracted by the coil. A leaf spring having a high magnetic reluctance can be used to couple the second member to the pulley in a position out of engagement with the first member. When energized, the coil overcomes a restoring force of the leaf spring and draws the two members into engagement.

The generation of engine output power is preferably regulated by a subthrottle control. The subthrottle is located along an air intake line shared by a main throttle that is controlled by a vehicle operator. A drive motor controls the position of the subthrottle. Normally, the subthrottle is open at least to the extent of the main throttle. However, the subthrottle can be closed more than the main throttle to further restrict the intake of air and thereby reduce the generation of engine output power.

The single point brake and the engine output regulator are preferably controlled by an electronic system that detects wheel slip and executes control logic for determining appropriate responses. Shut-down logic is also provided to deactivate the system or to prevent the single point brake from overheating.

DETAILED DESCRIPTION

Figure 1:
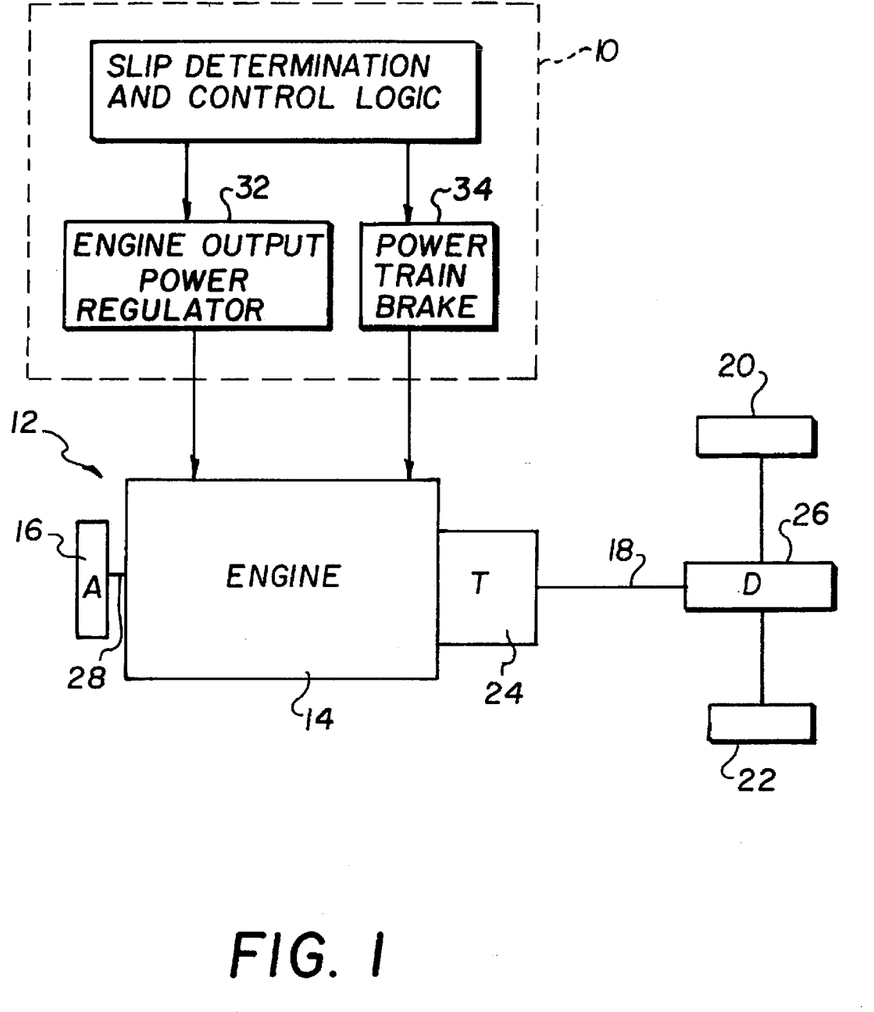
FIG. 1 is a block diagram of our basic traction system.

Our new hybrid traction control system 10 is referenced in FIG. 1 with respect to a power train 12 of a motor vehicle. The power train 12 originates with an internal combustion engine 14 that generates output power and extends in one direction to auxiliary devices 16 that receive a portion of the output power and in another direction along a drive line 18 to a pair of drive wheels 20 and 22 that receive a remaining portion of the output power.

The drive line 18 includes a transmission 24 and a differential 26. The transmission 24, along with the auxiliary devices 16, receives engine output power from an engine output shaft 28, also referred to as a crankshaft, and transmits the output power at selectable speed ratios. The differential 26, which is associated with a fixed ratio final drive, apportions the output power between the two drive wheels 20 and 22. The speed ratio changes across the transmission 24 and the differential 26 reduce the average rotational speed of the drive wheels 20 and 22 with respect to the rotational speed of the output shaft 28 and increase the total torque of the two drive wheels with respect to the torque of the output shaft 28.

The hybrid traction control system 10 includes slip determination and control logic 30 for operating an engine output power regulator 32 and a power train brake 34. The slip determination and control logic 30 provides for detecting drive wheel slip and for producing commands to the output power regulator 32 and the power train brake 34 for limiting wheel slip. Many hybrid traction control systems that combine engine output power control with drive wheel brake controls include substantially suitable slip determination and control logic. However, instead of controlling multiple wheel brakes, the slip determination and control logic 30 is only required to operate a single power train brake 34. Examples of such systems include U.S. Pat. No. 4,739,856 to Inagaki et al.; U.S. Pat. No. 4,762,196 to Harada et al.; U.S. Pat. No. 4,866,623 to Ise et al.; and U.S. Pat. No. 4,939,656 to Hoashi et al. All of these exemplary patents are hereby incorporated by reference.

The engine output power regulator 32 is also a commonplace feature of hybrid traction control systems. Although a subthrottle control is preferred, other engine power regulators that control engine operations such as ignition, fuel intake, or exhaust could also be used. Examples of such alternative regulators include U.S. Pat. No. 4,721,176 to Kabasin et al. and U.S. Pat. No. 5,265,693 to Rees et al. Also, a device for overriding an accelerator pedal is disclosed in U.S. Pat. No. 4,747,461 to Hayn et al. The patents containing these additional examples of engine output power regulators are also hereby incorporated by reference.

The power train brake 34 can be a single point brake located along the power train 12 between the auxiliary devices 16 and the differential 26. Although the power train 12 is depicted as a rear wheel drive, the power train brake 34 could also be located similarly in a front wheel drive power train or in an all wheel drive power train having a center differential that apportions power to front and rear drive axles. Thus, the brake 34 is located along the power train 12 from the engine 14 before the power train is split into separate drives to the drive wheels 20 and 22.

Preferably, the power train brake 34 is located between the auxiliary devices 16 and the transmission 24 and within a portion of the power train that rotates at the same speed as the engine output shaft 28. This reduces torque requirements of the power train brake 34 over torque requirements at other locations in the power train 12. As a result, the power train brake 34 can be sized smaller than drive wheel brakes that are required to impart much greater torques. The reduced torques are intended to lower drive line stresses and to avoid the drive line shocks associated with wheel brakes, and the location of the power train brake 34 adjacent to the engine 14 is intended to avoid drive line windups between wheel brakes and the engine that can cause instabilities.

Although the power train brake 34 is preferably an electromagnetically actuated friction brake, other forms of brakes could also be used including hydraulic or pneumatic brakes, eddy current retarders, and electro-rheological or electro-rheological magnetic fluid shearing devices. The electromagnetic friction brake is preferred for its accuracy, simple design, small size, low cost, and fast response time. One example is disclosed in U.S. Pat. No. 5,119,915 to Nelson, and this patent is also incorporated by reference.

The differential 26 is preferably a so-called "limited slip" or torque-proportioning differential that supports frictional resistance to relative rotation between the drive wheels 20 and 22. This limits relative slipping between the drive wheels 20 and 22 associated with uneven amounts of traction and permits the hybrid traction control system 10 to match transmissions of power more closely to the total amount of traction that is available to both of the drive wheels 20 and 22. The "hunting" instability between drive wheels associated with use of individual wheel brakes is thus eliminated.

Figure 2:
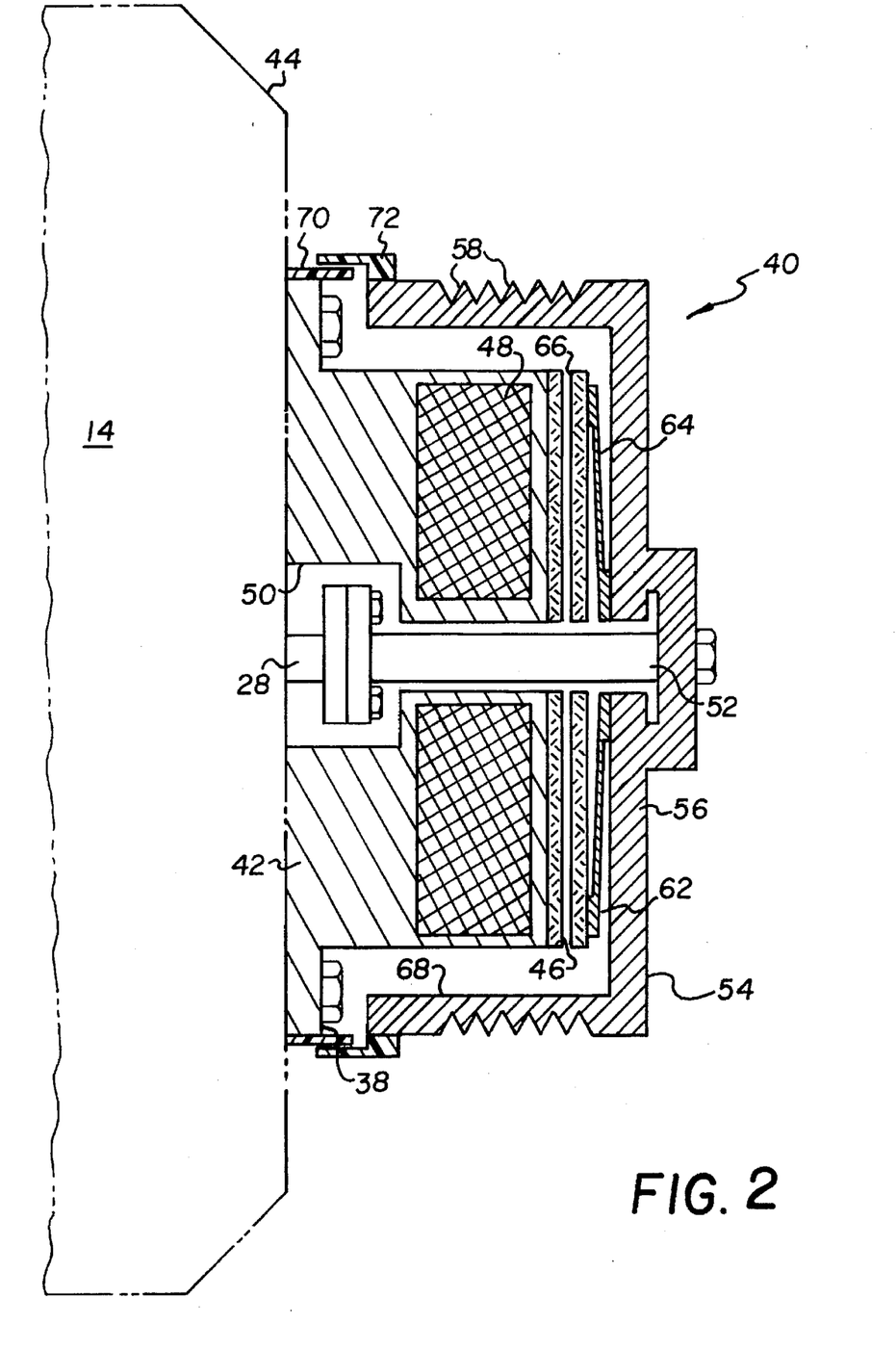
FIG. 2 is a cross-sectional view of our preferred single point brake.

FIG. 2 is a cross-sectional view of our preferred electromagnetic brake 40 located between the engine 14 and auxiliary devices 16. A fixed member 42 of the brake 40 has one end with a flange 38 that is attached to a block 44 of the engine 14 and another end that is covered by a durable friction surface 46. Within the fixed member 42 is an electrical coil 48 that can be energized for creating variable strength magnetic fields.

The output shaft 28 of the engine extends at least part way through a central opening 50 in the fixed member 42. However, instead of coupling the usual drive pulley directly to the output shaft 28 for transmitting power to the auxiliary devices 16, an extension shaft 52 is connected to the output shaft 28 for coupling a special cup-shaped drive pulley 54. One end of the drive pulley 54 is open and the other end is closed by a hub 56 that is connected to the extension shaft 52. Conventional grooves 58 are formed in a peripheral surface of the drive pulley 54 for aligning drive belts (not shown) with driven pulleys (also not shown) of the auxiliary devices 16.

A movable member 62 of the brake 40 has one end attached to the hub 56 of the drive pulley by a leaf spring 64 and another end covered by a durable friction surface 66 that is aligned with the friction surface 46 of the fixed member 42. The spring 64 couples the movable member 62 for rotation with the output shaft 28 but permits translation of the movable member 62 along the output shaft 28 with respect to the fixed member 42.

The movable member 62 could also be attached to the engine shaft 52 instead of the pulley 54, especially if the pulley is driven through a flexible coupling. Also, a pair of movable members 62 could be used to engage opposite ends of the fixed member 42. Support for the oppositely engaged fixed member 42 would be provided from outside its innermost engaged surface.

Normally, the spring 64 biases the friction surface 66 of the movable member out of engagement with the friction surface 46 of the fixed member. However, the movable member 62 also functions as an armature that is attracted to the fixed member 42 by energization of the coil 48. Electrical current within the coil 48 can be varied or modulated for engaging the friction surface 66 with the friction surface 46 to produce varying amounts of frictional resistance to rotation of the output shaft 28 with respect to the block 44.

The drive pulley 54 is formed with a hollow interior 68 for enclosing the fixed and movable members 42 and 62 of the brake 40. This arrangement saves space and protects the friction surfaces 46 and 66, as well as the magnetic components of the friction brake 40, from contamination. Overlapping seals 70 and 72, which are respectively attached to the open end of the drive pulley 54 and the flange 38 of the fixed member, provide further protection from contamination.

The attachment of the fixed member 42 of the brake directly on the engine block 44 permits the block 44 to be used as a heat sink for the friction brake 40. Accordingly, the brake 40 can be maintained at a more even temperature corresponding to the temperature of the engine block 44. Rotation of the drive pulley 54 could be used to circulate filtered air through the brake 40 to more quickly dissipate concentrations of heat. Also, the brake 40 could be periodically engaged to remove contaminants from the friction surfaces 46 and 66.

The size, mass, and response time of the brake 40 could be reduced by operating the brake 40 in a state of over excitation. For example, the brake could be designed for nominal use at 3 volts but actually used at 12 volts. Overheating can be avoided by limiting the duration of engagement or by more rapidly dissipating the heat. An algorithm could be used to estimate coil temperature based on a monitored duty cycle and various types of interventions could be used to avoid thermal damage. Response time could be further improved by storing the energy required to activate the brake in a storage mechanism such as a capacitor or an inductive coil. At the instant activation is required, the storage mechanism would discharge its energy into the brake.

Another way of reducing response time would be to operate the brake in a so-called "get ready" mode, where a minimum current is applied just short of actually engaging the brake. The minimum current would be applied when the control system 10 notes a condition that increases the likelihood of a need to subsequently engage the brake 40. Such conditions include the output of high engine torque such as low speed and low transmission gear, rapid throttle application, slip ratios approaching the threshold for wheel slip, and recent application of anti-lock braking or the traction control system.

A variety of other brake structures could be substituted for the electromagnetic brake 40 within the hollow interior 68 of the drive pulley 54. For example, one member could be relatively rotated and the other member relatively translated. More than two such members could be combined to form a compound brake. On the other hand, one of the members could be formed by the hollow interior 68 of the drive pulley as the rotating member of a drum brake. A disk brake could also be used, as well as other forms of actuation such as electric drives or hydraulic cylinders.

A front wheel drive application of our new hybrid traction system is shown in the remaining drawing figures. With initial reference to FIG. 3, a power train 76 is depicted including engine 78, a transmission 80, a front axle 82, and two front drive wheels 84 and 86. The transmission 80, as illustrated, incorporates a differential that apportions torque between the two front drive wheels 84 and 86.

Figure 3:
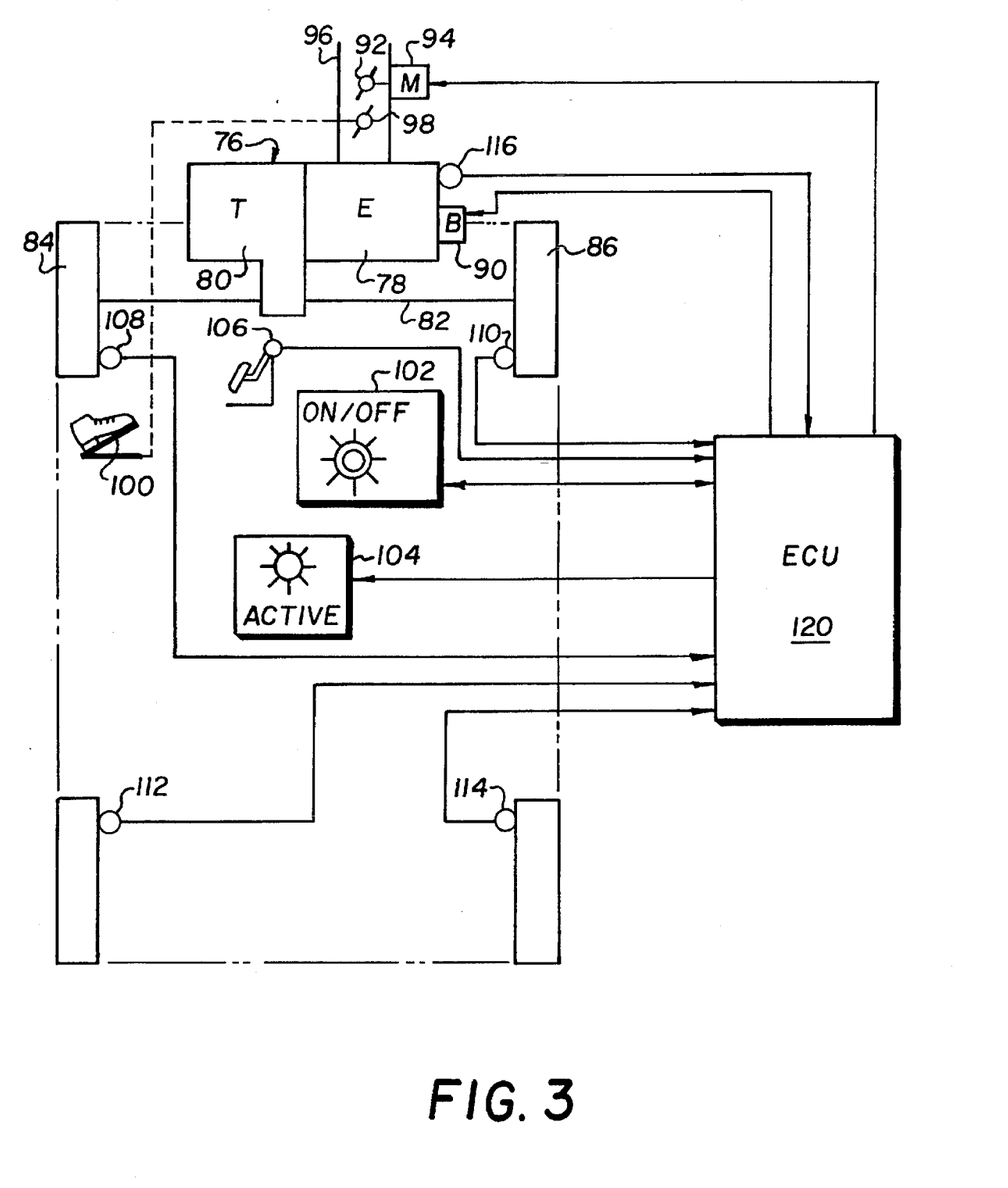
FIG. 3 is schematic diagram of the traction system applied to a front wheel drive vehicle.

A single point brake 90 is connected to the engine 78, between the engine output shaft and the engine block as shown in FIG. 2. A subthrottle 92 that is movable by an actuator 94 is positioned in series within a common air intake line 96 with a throttle 98 that is movable by an accelerator pedal 100 within the vehicle cab (not shown). Preferably, the actuator 94 is a stepper motor that can be rotated by predetermined amounts to accurately regulate air flows through the intake line 96.

Also within the cab are a traction control override switch 102, a traction control active light 104, and a brake pedal switch 106. Each wheel has a rotational speed sensor, namely, front left wheel sensor 108, front right speed sensor 110, rear left wheel sensor 112, and rear right speed sensor 114. Engine speed is monitored by speed sensor 116.

Figure 4:
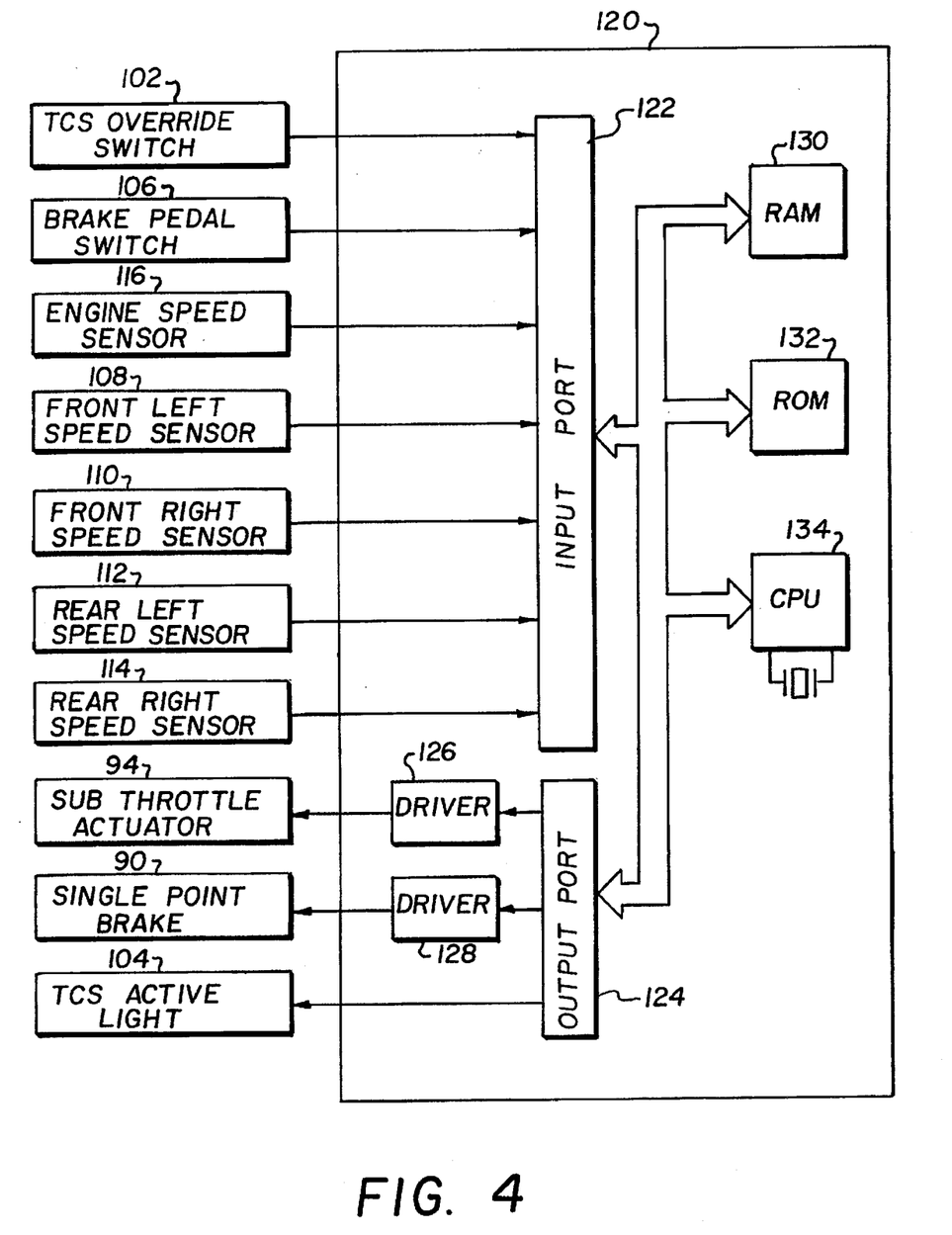
FIG. 4 is a block diagram of inputs to and outputs from an electronic control unit.

An electronic control unit 120, shown in more detail within FIG. 4, has input and output ports 122 and 124. The input port 122 receives signals from the traction control override switch 102, the brake pedal switch 106, the engine speed sensor 116, and all four wheel speed sensors 108, 110, 112, and 114. The output port 124 sends signals indirectly to the subthrottle actuator 94 and the single point brake 90 through respective drivers 126 and 128 and directly to the traction control active light 104. Also within the electronic control unit 120 is a conventional organization of random access memory 130, read only memory 132, and a central processing unit 134.

Figure 5:
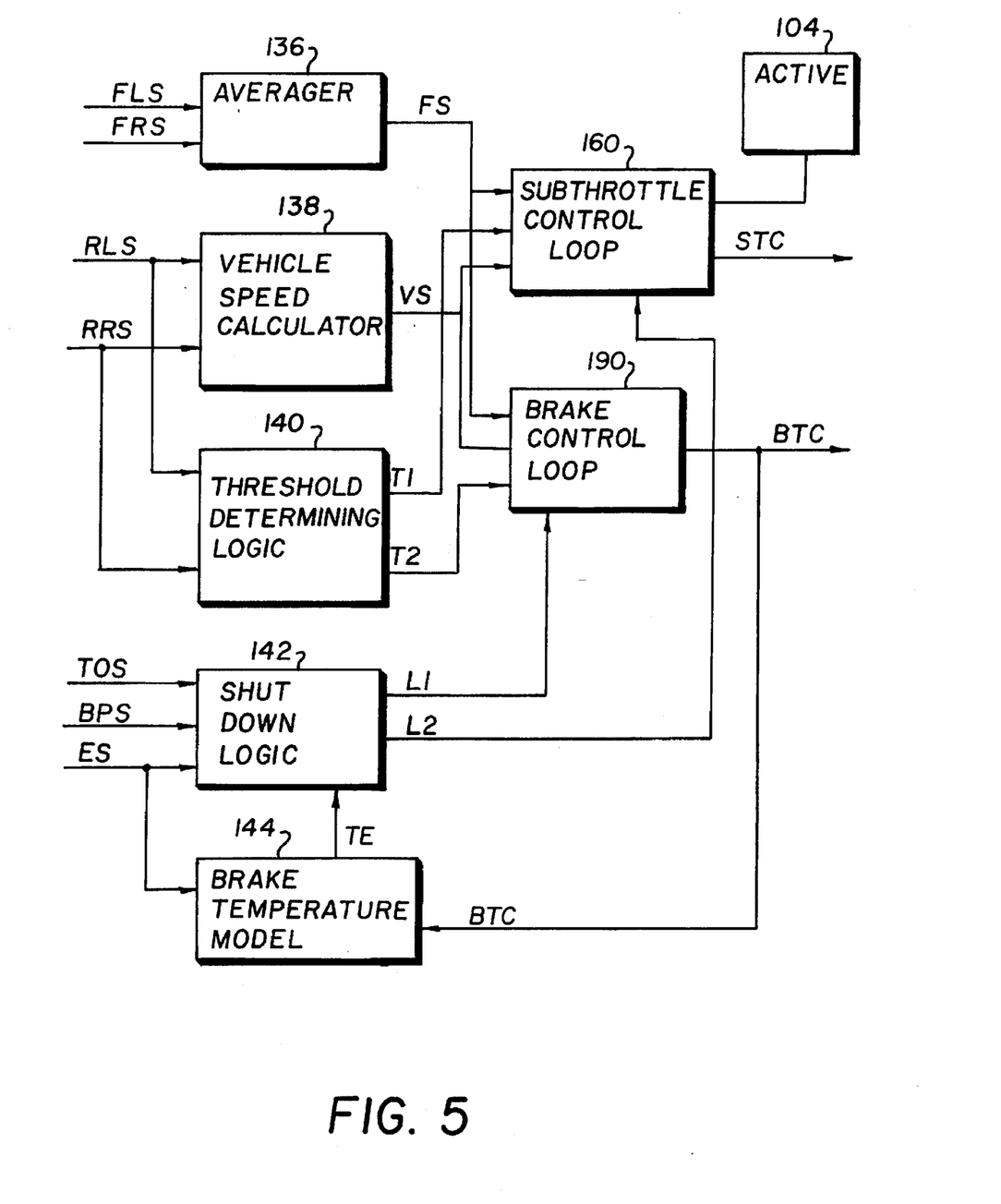
FIG. 5 is a block diagram of functions performed by the electronic control unit.

FIG. 5 shows the overall logic employed within the electronic control unit for detecting wheel slip and for controlling the subthrottle actuator 94 and brake 90. An averager 136 receives signals "FLS" and "FRS" from the left and right front wheel sensors 108 and 110 and outputs a signal "FS" that corresponds to an average speed of the two front drive wheels. 84 and 86. A vehicle speed calculator 138 receives signals "RLS" and "RRS" from the left and right rear wheel sensors 112 and 114 and outputs a signal "VS" that corresponds to a speed of the vehicle.

The signals "RLS" and "RRS" are also received by threshold determining logic 140 that outputs signals "T1" and "T2" in terms of multiples of vehicle speed above which a traction control response is required. The thresholds "T1" and "T2" can be varied in response to changing operating conditions estimated from the wheel speed signals "RLS" and "RRS". For example, U.S. Pat. No. 4,884,651 to Harada et al., which is hereby incorporated by reference, teaches how target slip values can be varied with longitudinal acceleration.

The thresholds "T1" and "T2" are also preferably varied (i.e., reduced) as functions of lateral acceleration, sacrificing some tractive effort for increased lateral stability. Lateral acceleration can either be estimated from the wheel speed signals "RLS" and "RRS" or a separate acceleration sensor could be used. Thus, the thresholds can be increased with increasing longitudinal acceleration but decreased with increasing lateral acceleration. Look-up tables can be used for determining the thresholds "T1" and "T2" for given values of lateral and longitudinal acceleration.

Shut-down logic 142 receives signals "TOS" and "BPS" indicating the respective states of the traction control override switch 102 and the brake pedal switch 106, a signal "ES" from the engine speed sensor 116, and a signal "TE" from a brake temperature model 144. The brake temperature "TE" is calculated according to a conventional algorithm from the signal "ES" that also represents brake speed and a signal "BTC" that represents brake torque. Output from the shut-down logic are two signals "L1" and "L2" that enable or disable the subthrottle actuator 94 or the single point brake 90.

Figure 6:
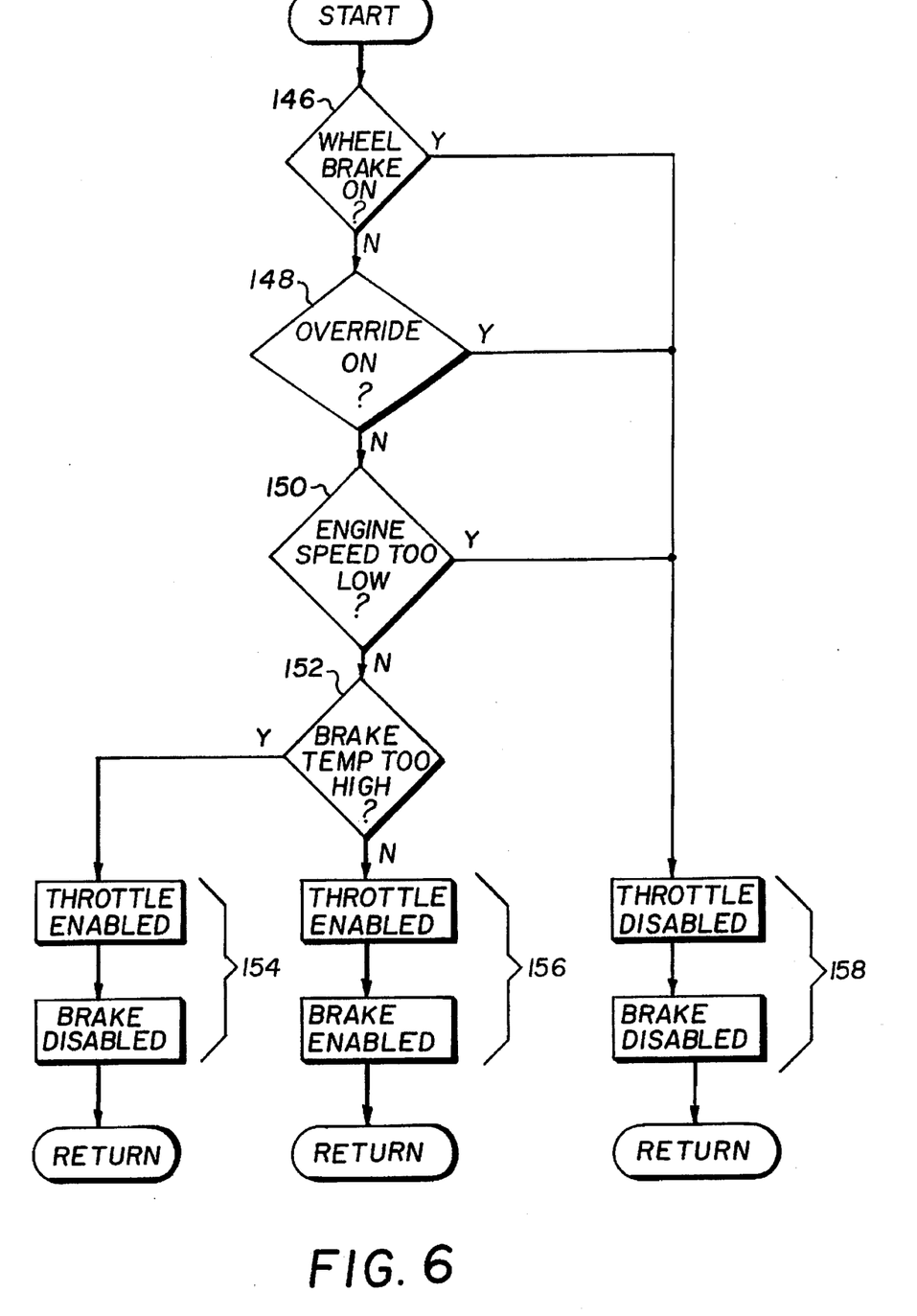
FIG. 6 is a flow chart of a shut-down function.

In FIG. 6, a flow chart illustrates four series decision steps 146, 148, 150, and 152 that are used to decide between three sets of responses 154, 156, and 158. The first three decisions 146, 148, and 150 check respectively if the brake pedal switch is on, if the traction control override switch is on, and if the engine speed is too low. An affirmative answer to any one of these questions selects the response 158 which disables both the subthrottle actuator 94 and the single point brake 90. The fourth decision 152, which checks if the brake temperature is too high, decides between two remaining responses 154 and 156. If the brake temperature is too high, then the response 154 is selected which enables the subthrottle actuator 94 but disables the brake 90. If the brake temperature is within an acceptable limit, then the response 156 is selected which enables both the subthrottle actuator 94 and the single point brake 90.

Figure 7:
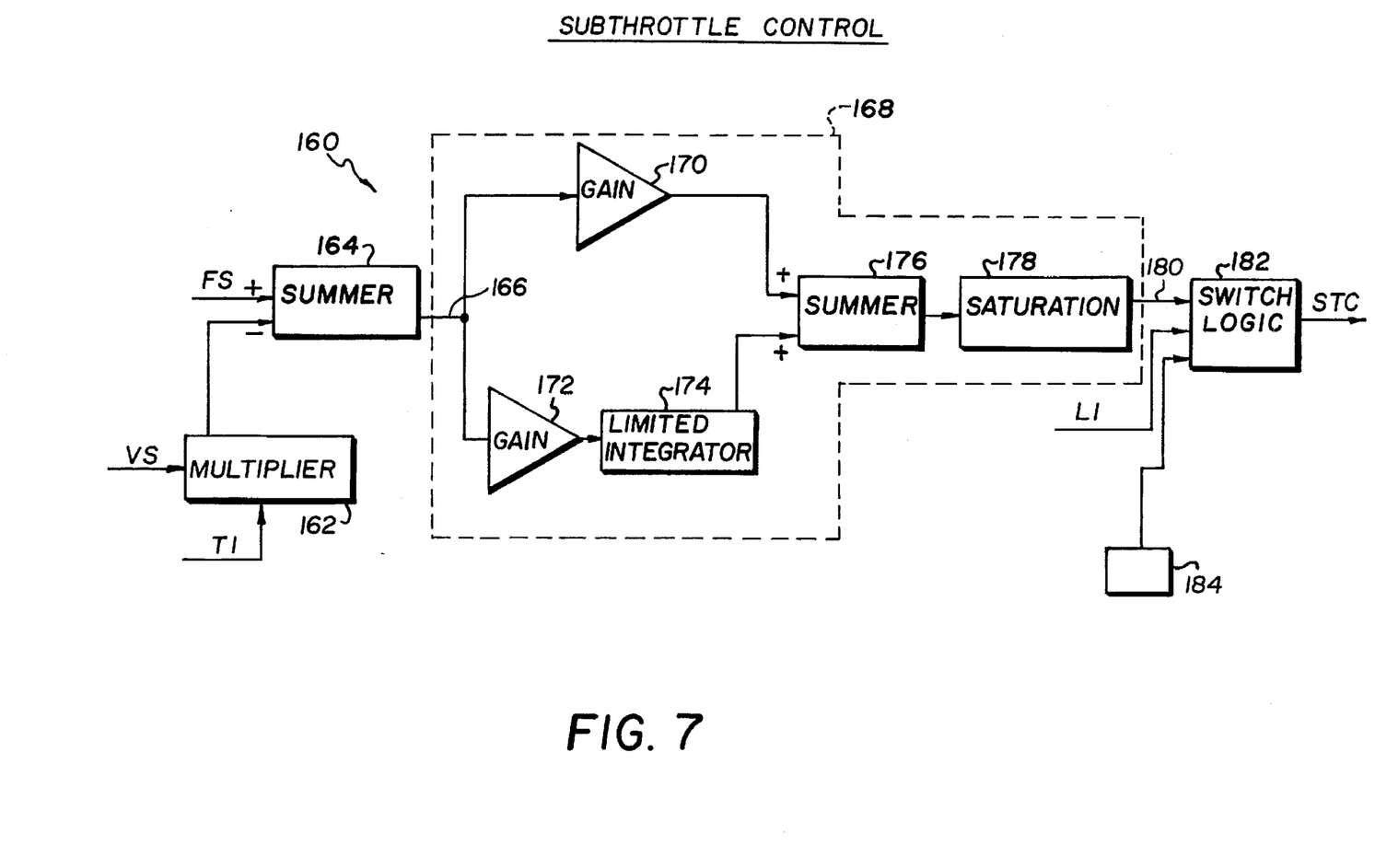
FIG. 7 is a functional schematic of a subthrottle control loop.

A subthrottle control loop 160, as depicted in FIG. 7, includes a multiplier 162 that receives the signals "VS" and "T1" and a summer 164 that receives the signal "FS" along with output from the multiplier 162. The summer 164 compares the average speed "FS" of the front drive wheels to a multiple of the vehicle speed "VS" (in common units) and outputs an error signal 166 representative of excessive wheel slip. The error signal 166 is processed by a proportional integral controller 168, which integrates the error signal 166 and scales it to the subthrottle actuator 94. The proportional integral controller 168 includes the usual features of two gain elements 170 and 172, a limited integrator 174, a summer 176, and a saturation element 178 that maintains an output signal 180 within bounds of the subthrottle actuator 94.

Switch logic 182 receives the calculated output signal 180, shut-down logic signal "L1", and a shut-down value signal 184 having a value of "100". When the logic signal "L1" indicates that the subthrottle is to be enabled, then the switch logic 182 passes the signal 180 as a subthrottle command signal "STC". However, when the subthrottle is to be disabled, the shut-down value is assigned to the subthrottle command signal "STC". For example, the subthrottle 92 is preferably positioned 100 percent open when disabled.

Figure 8:
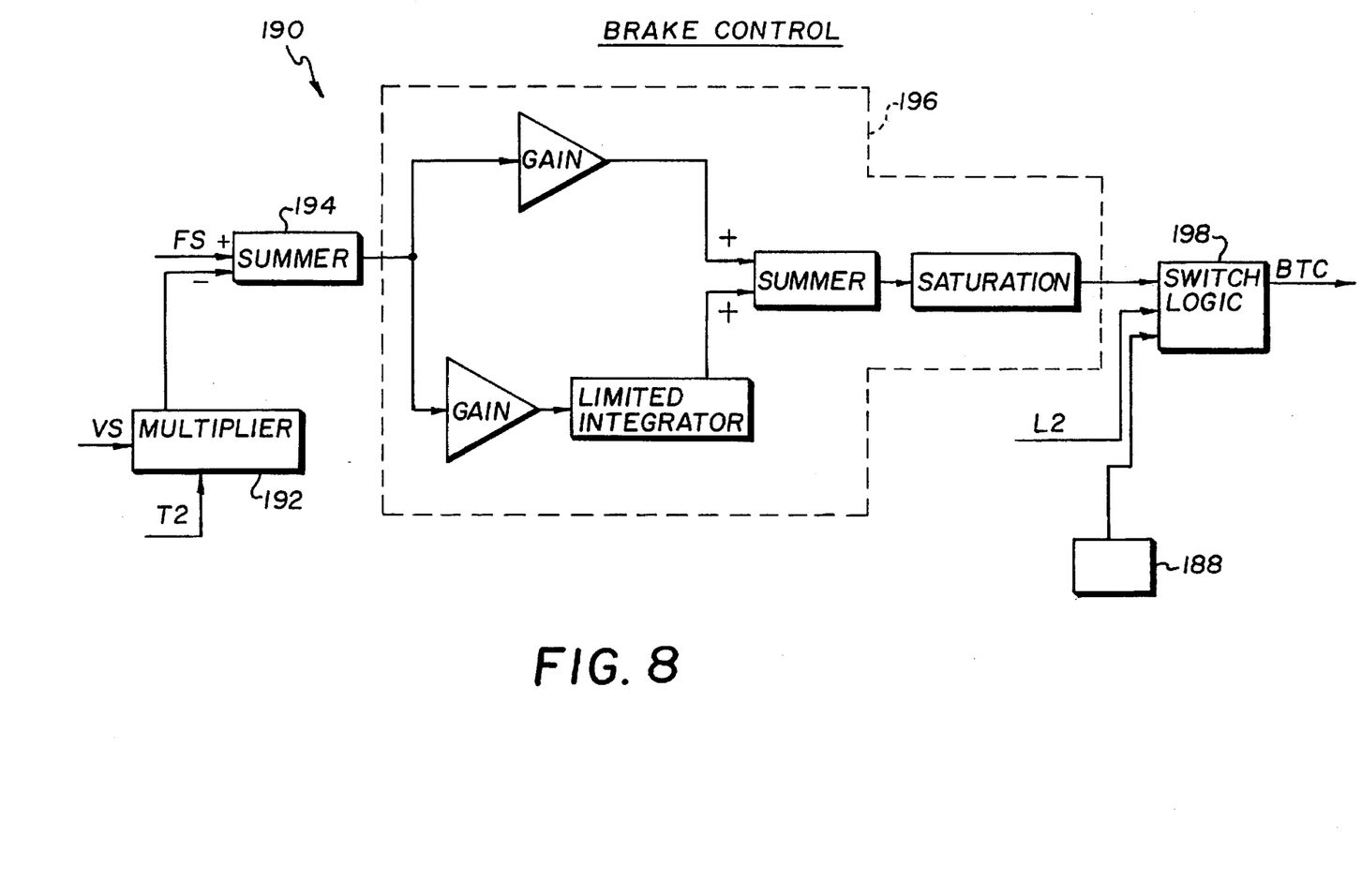
FIG. 8 is a functional schematic of a brake control loop.

A brake control loop 190 illustrated in FIG. 8 is similar to the subthrottle control loop 160. For example, the brake control loop 190 includes a multiplier 192, a summer 194, a proportional integral controller 196, and switch logic 198. However, the multiplier 192 receives threshold "T2" instead of "T1", and the switch logic 198 receives shut-down logic signal "L2" instead of "L1" and a different shut-down value signal 188 having a value of "0". Also, the proportional integral controller integrates and scales the slip signal from the summer 194 to an appropriate response of the single point brake 90.

The switching logic 198 passes the output of the proportional integral controller 196 as a brake command signal "BTC" when the signal "L2" indicates that the brake is to be enabled. However, the shut-down value is assigned to the brake command signal "BTC" when the same signal indicates that the brake is to be disabled. Preferably, the brake is completely disengaged (i.e., producing "0" friction torque) when disabled.

Figure 9A:
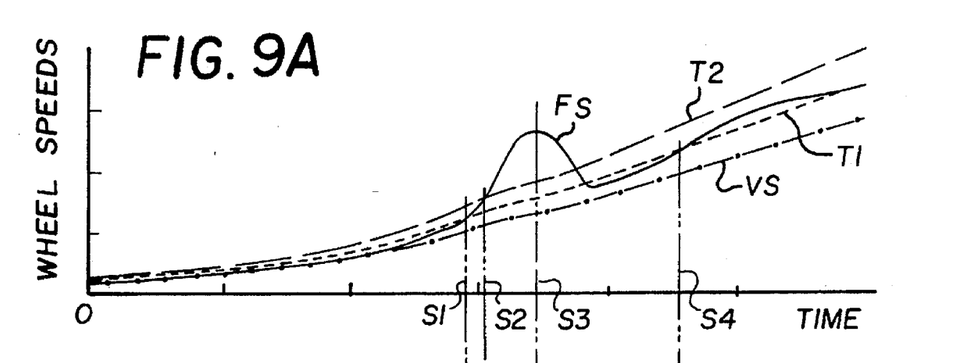
FIGS. 9A–9C are graphs representing the performance of the traction system using different thresholds for engaging the subthrottle and the brake.
Figure 9B:
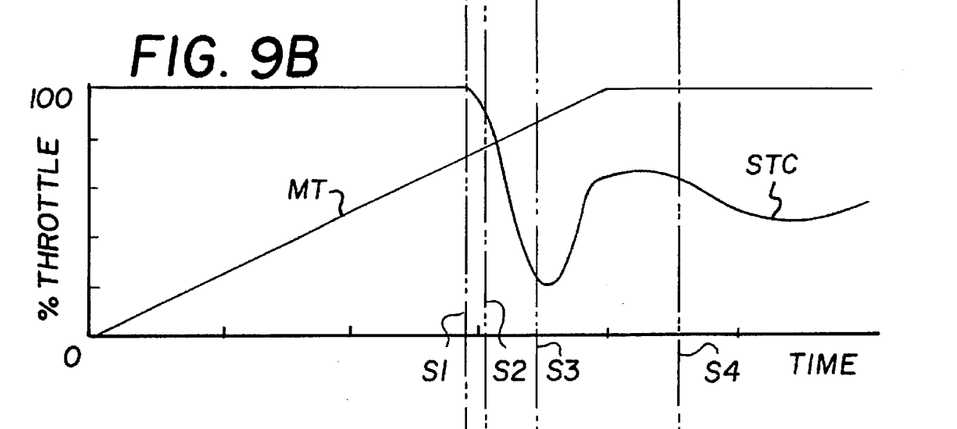
Figure 9C:
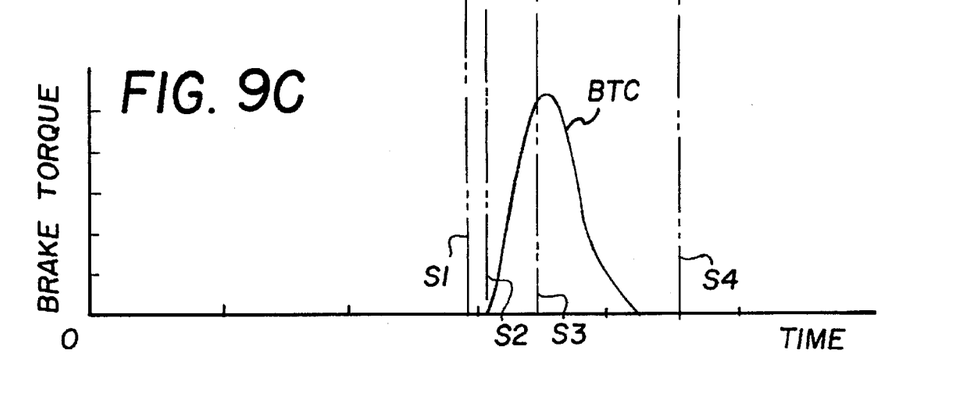

FIGS. 9A–9C show the effects of actuating the subthrottle 92 and the single point brake 90 at different respective thresholds "T1" and "T2". FIG. 9A plots the vehicle speed "VS", the front drive wheel average speed "FS", and the two thresholds "T1" and "T2" as products of vehicle speed "VS". FIGS. 9B and 9C share with FIG. 9A a similarly scaled abscissa in units of time, but separately plot the subthrottle command "STC" in units of throttle angle and the brake command "BTC" in units of brake torque.

At time "s1", drive wheel speed "FS" first exceeds the threshold "T1", and the subthrottle responds by beginning to close. However, starting at 100 percent throttle angle, a small amount of time is required before the subthrottle 92 actually begins to further restrict air flows by closing more than the main throttle 98, whose performance is plotted as line "MT". This delay could be avoided by linking the subthrottle 92 to the main throttle 98 so that the subthrottle 92 starts to close from a position closer to the position of the main throttle 98.

The drive wheel speed "FS" exceeds the threshold "T2" at time "s2", and the single point brake 98 is engaged. Until the wheel speed "FS" starts to decrease at time "s3", the subthrottle angle "STC" continues to decrease and the brake torque "BTC" continues to increase. Thereafter, the subthrottle angle "STC" gradually increases and the brake torque "BTC" gradually decreases. However, at time "s4", wheel speed "FS" again exceeds the threshold "T1", but the subthrottle response is sufficient to maintain the wheel speed "FS" near the target threshold "T1" without requiring further engagement of the brake 90.

Although the invention has been described in its preferred embodiment as a hybrid traction control system combining engine output limiting with a single point brake, it would also be possible to obtain significant traction benefits from the use of the single point brake alone or in combination with other traction-aiding devices. For example, a significant traction improvement could be obtained by combining the single point brake with a limited slip differential. Our invention could also be used in other vehicle control systems, such as vehicle dynamic control systems or braking systems, where reductions in engine output may be required independently of the prevailing traction conditions. The engine could also take other forms for producing an output that powers the drive wheels.

I claim:

1. A hybrid control system for limiting output of a motor vehicle engine comprising:

a power train originating at an engine for generating output power and extending from said engine in a first direction to at least one auxiliary device that consumes a portion of the output power and in another direction through a differential that apportions the remaining output power between at least a pair of drive wheels;

said engine having a block and a relatively rotatable output shaft that transmits the output power to the power train;

an engine output power controller that regulates generation of the output power by the engine;

a brake positioned along said power train between said auxiliary device and said differential for regulating the transmission of the output power along said power train to the pair of drive wheels;

a sensor that detects a vehicle operating condition;

a control system that responds to the detection of the vehicle operating condition by engaging both said engine controller and said brake for reducing the output power transmitted to the drive wheels;

a first member of said brake being fixed against relative rotation with respect to said engine block;

a second member of said brake being at least indirectly connected to said engine output shaft; and said first and second brake members being relatively engageable by said control system for producing resistance to rotation of said engine output shaft with respect to said engine block.

2. The system of claim 1 in which said first brake member is attached to said engine block.

3. The system of claim 2 in which said engine output shaft extends through an opening in said first brake member for transmitting the output power to said power train.

4. The system of claim 1 in which said second brake member rotates at a speed at least as great as a speed of said engine output shaft.

5. The system of claim 4 in which said second brake member rotates at the same speed as said engine output shaft.

6. The system of claim 5 in which said second brake member is coupled to said engine output shaft for rotation about a common axis.

7. The system of claim 6 in which said first and second brake members are relatively movable along the common axis into engagement.

8. The system of claim 1 in which a drive member is coupled to said engine output shaft for transmitting the output power to said auxiliary device and said brake is located between said engine block and said drive member.

9. The system of claim 8 in which said second brake member is coupled to said engine output shaft for rotation about a common axis.

10. The system of claim 9 in which said engine output shaft extends through an opening in said first brake member for connection to said drive member.

11. The system of claim 10 in which said first brake member is attached to said engine block.

12. The system of claim 11 in which said drive member is a pulley.

13. The system of claim 1 in which said first brake member includes an electromagnetic coil and said second brake member includes an armature that is attracted toward said first member upon energization of said coil.

14. The system of claim 13 in which said first and second brake members are biased into a relative position of disengagement.

15. The system of claim 1 in which said sensor detects wheel slip of at least one drive wheel and said control system responds to the detection of wheel slip by engaging both said engine controller and said brake.

16. The system of clam 15 in which said differential generates frictional resistance to relative rotation between the pair of drive wheels.

17. The system of claim 1 in which said control system responds to the detection of another operating condition that is known to precede the vehicle operating condition by reducing a response time required to engage said first and second brake members.

18. The system of claim 15 in which at least one of said brake members is responsive to an electric current, and the response time is reduced by applying a predetermined amount of the electric current to said one brake member less than an amount of the electric current required to engage said first and second brake members.

19. The system of claim 18 in which said another operating condition includes a first threshold of wheel slip below a second threshold of wheel slip at which said control system engages said brake members.

20. A hybrid control system for a motor vehicle engine comprising:

an engine having a block and a relatively rotatable output shaft that transmits output power generated by said engine to a pair of drive wheels;

an engine output power controller that regulates the generation of the output power by the engine;

a brake that regulates the transmission of the output power to the pair of drive wheels;

a sensor that detects a vehicle operating condition;

a control system that responds to the detection of the vehicle operating condition by engaging both said engine controller and said brake for reducing the output power transmitted to the drive wheels;

a first member of said brake being fixed against relative rotation with respect to said engine block;

a second member of said brake being at least indirectly connected to said engine output shaft for rotation at a speed at least as great as a speed of said engine output shaft; and said first and second brake members being relatively engageable by said control system for producing resistance to rotation of said engine output shaft with respect to said engine block.

21. The system of claim 20 in which said first brake member is attached to said engine block.

22. The system of claim 21 in which said engine output shaft extends through an opening in said first brake member for transmitting the output power to said power train.

23. The system of claim 21 in which said second brake member is coupled to said engine output shaft for rotation about a common axis.

24. The system of claim 23 in which said second brake member rotates at the same speed as said engine output shaft.

25. The system of claim 24 in which said first and second brake members are relatively movable along the common axis into engagement.

26. The system of claim 20 in which said first brake member includes an electromagnetic coil and said second brake member includes an armature that is magnetically affected by said first member upon energization of said coil.

27. The system of claim 26 in which said electromagnetic coil is operated in a state of over excitation for engaging said first and second brake members.

28. The system of claim 20 in which said control system responds to the detection of another operating condition that is known to precede the vehicle operating condition by reducing a response time required to engage said first and second brake members.

29. The system of claim 28 in which at least one of said brake members is responsive to an electric current, and the response time is reduced by applying a predetermined amount of the electric current to said one brake member less than an amount of the electric current require to engage said first and second brake members.

30. The system of claim 28 in which said another operating condition includes prior engagement of said first and second brake members.

31. An engine control system comprising:

a sensor for detecting a first vehicle operating condition;

a processor that outputs a first control signal in response to the detection of the first vehicle operating condition;

an engine having a block and an output shaft;

said output shaft being rotatable in said engine block about an axis;

a first brake member attached to said engine block;

a second brake member coupled to said output shaft for rotation therewith about said axis; and an actuator that engages said first and second members in response to said first control signal for resisting rotation of said output shaft with respect to said engine block.

32. The system of claim 31 in which said output shaft extends through an opening in said first brake member for connection to another drive member powered by said engine.

33. The system of claim 31 in which said first brake member includes an electromagnetic coil and said second brake member includes an armature that is magnetically affected by said first member upon energization of said coil.

34. The system of claim 33 in which said first and second brake members are biased into a relative position of disengagement.

35. The system of claim 33 in which said electromagnetic coil is operated in a state of over excitation for engaging said first and second brake members.

36. The system of claim 31 in which said processor outputs a second control signal indicative of a second vehicle operating condition that is known to precede the first vehicle operating condition.

37. The system of claim 36 in which said actuator is responsive to said second control signal for reducing a response time required to engage said first and second brake members.

38. The system of claim 37 in which one of said brake members includes an electromagnetic coil, and said second control signal applies a current to said coil that is less than the current required to engage said first and second brake members.

* * * * *